Patented Oct. 14, 1941

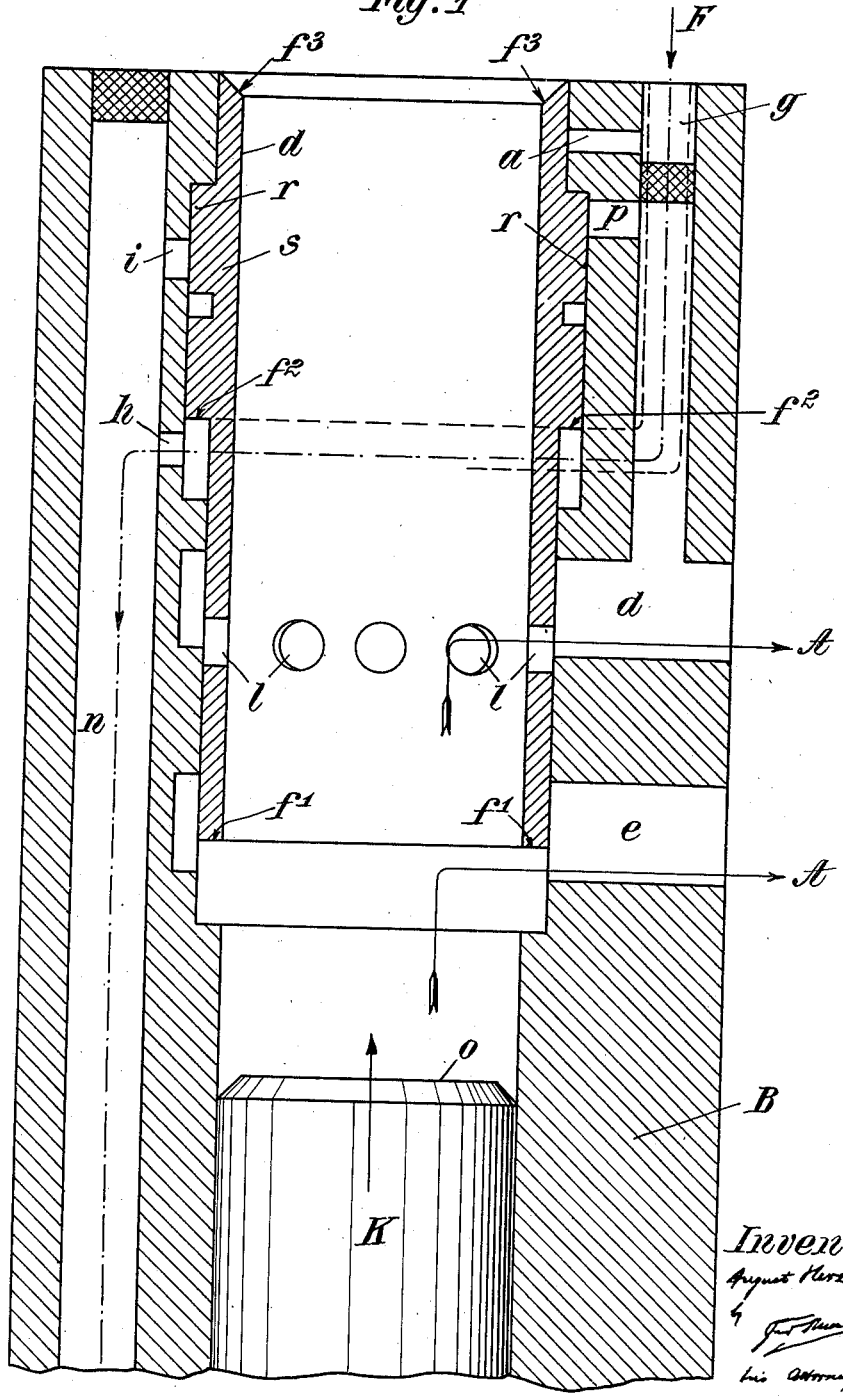

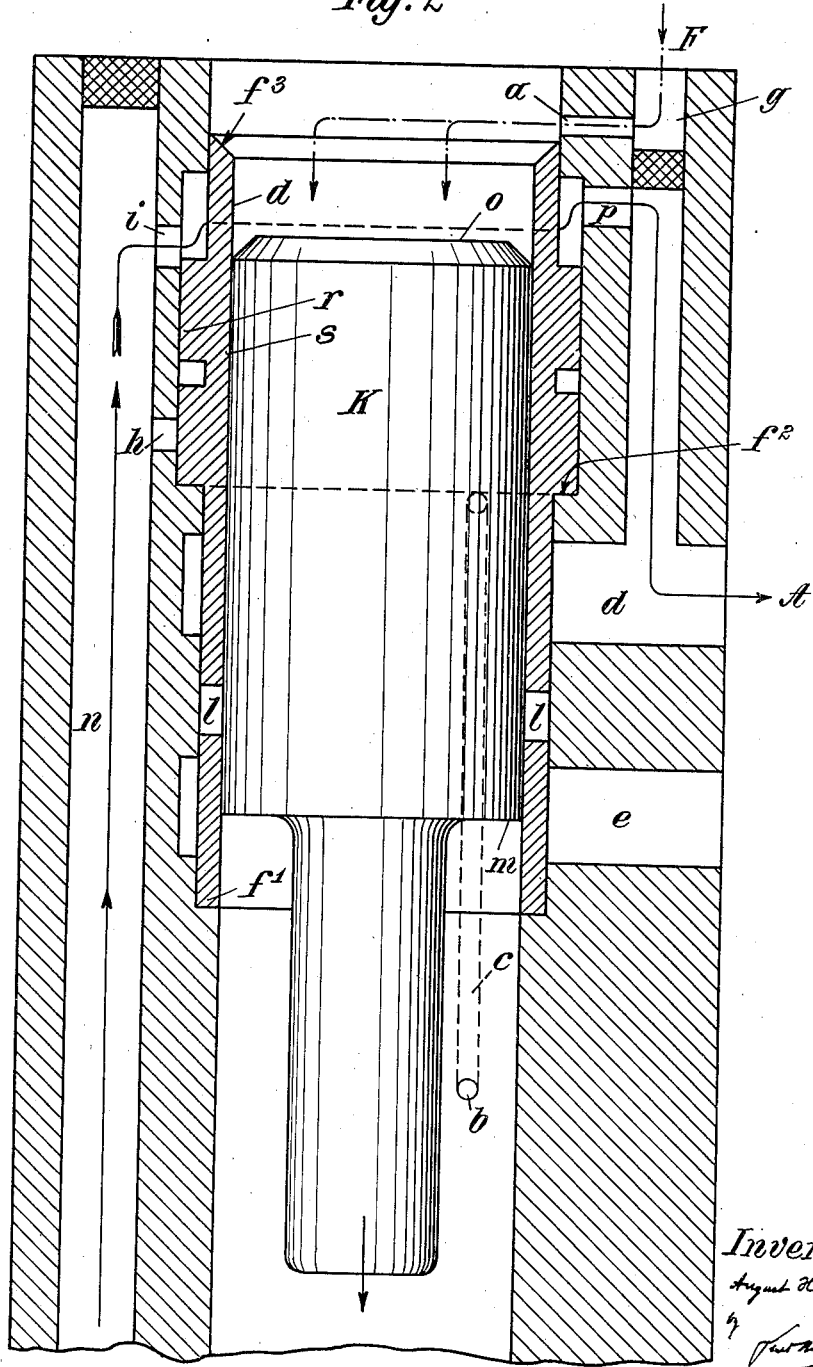

2,259,379

UNITED STATES PATENT OFFICE 2,259,379

PNEUMATIC PERCUSSION TOOL WITH SLIDE VALVE CONTROL GEAR

August Herzbruch, Sprockhövel, Germany, assignor to Stahlwerk Mark Wengern A. G., Wengern, Ruhr, Germany, a body corporate of Germany Application August 11, 1939, Serial No. 289,619
In Germany February 4, 1939

1 Claim. (Cl. 121—26)

This invention relates to a control gear for pneumatic percussion tools which gear enables the recoil forces to be reduced to a minimum merely by suitably shaping the slide valve and by the arrangement of the outlet apertures, avoiding, however, the use of separate auxiliary means.

Slide valve control gears are known in pneumatic percussion tools which gears show primarily only the advance in the development of the increase in performance and economy, but in which very heavy recoil forces occur which soon tire the operator and are injurious to him in continuous work.

A considerable reduction of the hammer recoil stresses is attained according to the invention in that sudden increases in pressure in the cylinder, such as are produced by the sudden entry of air under high pressure into a space at low pressure, are avoided as the piston compresses before the sudden entry of the compressed air the air remaining in the cylinder, so that the compression pressure and compressed air pressure must be positively the same before the tubular slide valve commences to allow the admission of the compressed air.

For this purpose the slide valve has annular control surfaces and is constructed as a differential tube, and the position of the outlet apertures is so chosen, that the compression pressure necessary for the reversal is attained after the longest possible compression stroke; moreover thereby that the sizes of the control surfaces on the slide valve are proportioned so that the slide valve reverses when the compression pressure corresponds to the actual admission pressure and that this moment is only reached when the piston has performed its full stroke, that is, is located as near as possible to the cylinder cover.

An embodiment of the invention is illustrated diagrammatically by way of example in the accompanying drawings, in which:

Fig. 1 shows a cylinder in longitudinal section with the slide valve position during the return stroke of the piston, Fig. 2 is a similar view, the slide valve being in that position during the striking stroke.

According to the invention the tubular slide valve S, axially movable to a limited extent in the cylinder B of the tool, is constructed as a simple differential tube in such a manner that the lower annular end face $f^1$ and the upper end face $f^3$ are constructed as control pressure surfaces.

As the outer periphery of the slide valve has an annular enlargement $r$, another pressure control surface $f^2$ is formed. The bore $d$ of the tubular slide valve S serves as guide for the piston $k$.

The outlet apertures $l$ are arranged in proximity to the lower end face $f^1$ of the slide valve. The outlet apertures $e$ and $d$ are arranged in the wall of the cylinder B in a position corresponding to the outlet apertures $l$ in the slide valve S and lead to the atmosphere.

The operation is as follows:

In Fig. 1 the slide valve S is in its highest position. The piston $k$ is performing its return stroke. Fresh air flows in the direction of the arrow F into the fresh air passage $g$, flows around the tubular slide valve S and passes through the bore $h$ in the wall of the cylinder B into the passage $n$ to the front end $m$ of the piston $k$, to force this piston $k$ upwards.

The exhaust air A passes into the atmosphere through the bores $d$ and $e$ in the wall of the cylinder B by way of the lower end of the slide valve S and outlet apertures $l$ in the slide valve with the least resistance to movement of the piston $k$.

The tubular slide valve S is subjected to the following pressures. The controlling and pressure surfaces $f^1$ and $f^3$ are under atmospheric pressure, whereas the pressure surface $f^2$ is subjected to the fresh air pressure from below, so that the slide valve S is positively held in its highest position.

Upon upward movement of the piston $k$, the lower outlet bore $e$ is first closed with initial resistance offered to movement of the piston by the holes $l$ and the bore $d$ only remaining open, and when the upper edge of the piston $o$ moves over the row of holes $l$ in the slide valve, the exhaust of air is cut off and the compression commences above the piston $k$. The compression pressure bears against the pressure surface $f^3$. As the row of holes $l$ in the slide valve S is arranged at the bottom near the lower end face, a long compression path is produced with the result that the increase in pressure takes place gradually by the successive closing of the outlets $e$ and $l$—$d$.

By the construction and arrangement of the slide valve S the surface ratio of the two effective pressure surfaces $f^2$ and $f^3$ is such, that the compression pressure must increase to fresh air pressure because $f^2$ is under fresh air pressure, until balance of the forces is established, and in the case of the slightest increase in pressure, the pressure on the pressure surface $f^3$ becomes greater than on $f^2$ before the downward movement of the slide valve S into the position shown in Fig. 2 takes place.

In Fig. 2 the piston $k$ is carrying out the striking stroke. The fresh air flows in the direction of the arrow F through the exposed row of holes $a$ in the cylinder B on to the upper piston face $o$, whereas the lower piston face $m$ is in communication with the atmosphere.

A reversing passage $c$ with a lower port $b$ leads to the pressure surface $f^2$ on the slide valve S. As soon as the upper edge $o$ of the piston exposes the port $b$ leading to the reversing passage $c$, the cylinder air flows through the reversing passage $c$ on to the pressure face $f^2$ of the slide valve S and again presses the slide valve S into its highest position shown in Fig. 1.

During this movement the exhaust air A below the piston $k$ is conducted in the direction of the arrow into the atmosphere through the passage $n$, the aperture $i$ in the wall of the cylinder B, around the slide valve S, through the aperture $p$ into the passage leading to the outlet aperture $d$.

By this construction and arrangement of the control gear the pneumatic percussion tool has extremely weak recoil thrust without additional auxiliary means, with the result that the life of the tool is prolonged without reducing its efficiency.

The economy of the tool is very considerably improved by this constructional measure, because on the one hand the clearance at the end of the stroke is already filled with air of the same pressure and its filling with fresh air is eliminated, and on the other hand the fatiguing pauses become much less, with the result that higher hourly outputs are obtained.

I claim:

A pneumatic percussion tool with slide valve control gear, comprising in combination, a cylinder having a pair of longitudinally spaced outlet apertures in a side wall thereof, a slide valve directly constructed as a differential tubular slide valve and having a lower end face constructed as a pressure surface, an upper end face constructed as a pressure surface, a pressure surface formed on the periphery of the slide valve adjacent the upper end thereof, a piston reciprocably mounted in the cylinder and slide valve, said slide valve having an annular series of outlet apertures therein below the pressure surface on the periphery of the slide valve, said longitudinally spaced outlet apertures in the wall of the cylinder being spaced below the pressure surface on the periphery of the slide valve, the lower end of the slide valve adapted to form a closure for one of the outlet apertures in the cylinder and the wall of the cylinder between the outlet apertures therein forming a closure for the outlet apertures of the slide valve when the latter is at its limit of downward movement, the outlet apertures in the wall of the cylinder and in said slide valve being so arranged that the compression pressure, necessary for the reversal and resulting in a considerable reduction in the recoil of the percussion tool, is attained when the piston has performed its full stroke in proximity of the cover of the cylinder.

AUGUST HERZBRUCH.